United States Patent
Brunswig et al.

(10) Patent No.: US 9,406,044 B2
(45) Date of Patent: Aug. 2, 2016

(54) RULE-BASED DETERMINATION AND VALIDATION IN BUSINESS OBJECT PROCESSING

(75) Inventors: Frank Brunswig, Heidelberg (DE); Rakesh Kumar, Bangalore (IN); Preeta K, Bangalore (IN); Vijay G, Bangalore (IN)

(73) Assignee: SAP SE, Walldorf (DE)

( * ) Notice: Subject to any disclaimer, the term of this patent is extended or adjusted under 35 U.S.C. 154(b) by 918 days.

(21) Appl. No.: 13/335,430

(22) Filed: Dec. 22, 2011

(65) Prior Publication Data

US 2013/0166472 A1    Jun. 27, 2013

(51) Int. Cl.
| G06F 15/16 | (2006.01) |
| G06F 7/00 | (2006.01) |
| G06Q 10/10 | (2012.01) |
| G06Q 10/06 | (2012.01) |
| H04L 29/08 | (2006.01) |

(52) U.S. Cl.
CPC ............... *G06Q 10/10* (2013.01); *G06Q 10/06* (2013.01); *H04L 67/02* (2013.01)

(58) Field of Classification Search
CPC ............. G06F 8/10; G06F 8/20; G06Q 10/10; G06Q 10/06; G06Q 10/06313; G06Q 10/06375; H04L 67/02
See application file for complete search history.

(56) References Cited

U.S. PATENT DOCUMENTS

| 7,313,575 | B2 * | 12/2007 | Carr ....................... G06Q 10/10 |
| 7,636,911 | B2 * | 12/2009 | Kristoffersen ......... G06Q 30/00 707/999.103 |
| 7,761,478 | B2 * | 7/2010 | Akkiraju ................ G06Q 10/06 706/45 |
| 8,015,541 | B1 * | 9/2011 | Srinivasan ................ G06F 8/20 717/104 |
| 8,027,922 | B2 * | 9/2011 | Lee ......................... G06Q 10/10 705/50 |
| 2006/0026168 | A1 * | 2/2006 | Bosworth ................. G06F 8/60 |
| 2006/0235899 | A1 * | 10/2006 | Tucker .......................... 707/200 |
| 2007/0288508 | A1 * | 12/2007 | Brunswig ............... G06F 9/547 |
| 2008/0155556 | A1 * | 6/2008 | Gabriel et al. ................ 719/316 |
| 2009/0007061 | A1 * | 1/2009 | Ben-Zvi .................... G06F 8/10 717/105 |
| 2011/0029947 | A1 * | 2/2011 | Markovic ............... G06Q 10/10 717/102 |

OTHER PUBLICATIONS

Haller et al, An ontology for internal and external business processes, May 2006, 2 pages.*
Scheithauer et al., Business modeling for service descriptions: a meta model and a UML profile, Dec. 2009, 10 pages.*

* cited by examiner

*Primary Examiner* — Thuy Dao

(74) *Attorney, Agent, or Firm* — Schwegman Lundberg & Woessner, P.A.

(57) ABSTRACT

A method to model a business object is disclosed. An analysis module analyzes elements of a business object. A modeling module models business object logic based on the elements of the business object. An implementation module implements the modeled business object logic. A repository stores the modeled business object logic. A business object runtime module executes the modeled business object logic.

19 Claims, 20 Drawing Sheets

Node Operation : Create / Delete of a node in the BO

RULE-BASED DETERMINATION AND VALIDATION IN BUSINESS OBJECT PROCESSING

TECHNICAL FIELD

The present application relates generally to the field of modeling business objects of software applications, and, in one specific example, to business object processing.

BACKGROUND

Employees of a company or enterprise may be more familiar with some software applications than others. For example, the employees may be very familiar with personal productivity applications (e.g., Microsoft Outlook), but they may not be as familiar with back-end business software applications (e.g., business intelligence; enterprise information management; enterprise performance management; governance, risk, and compliance; analytic software applications). In particular, employees seeking to model and design business objects are required to access a variety of scattered tools available via on-premise installation.

BRIEF DESCRIPTION OF THE DRAWINGS

Some embodiments are illustrated by way of example and not limitation in the figures of the accompanying drawings in which.

DETAILED DESCRIPTION

Figure 1:
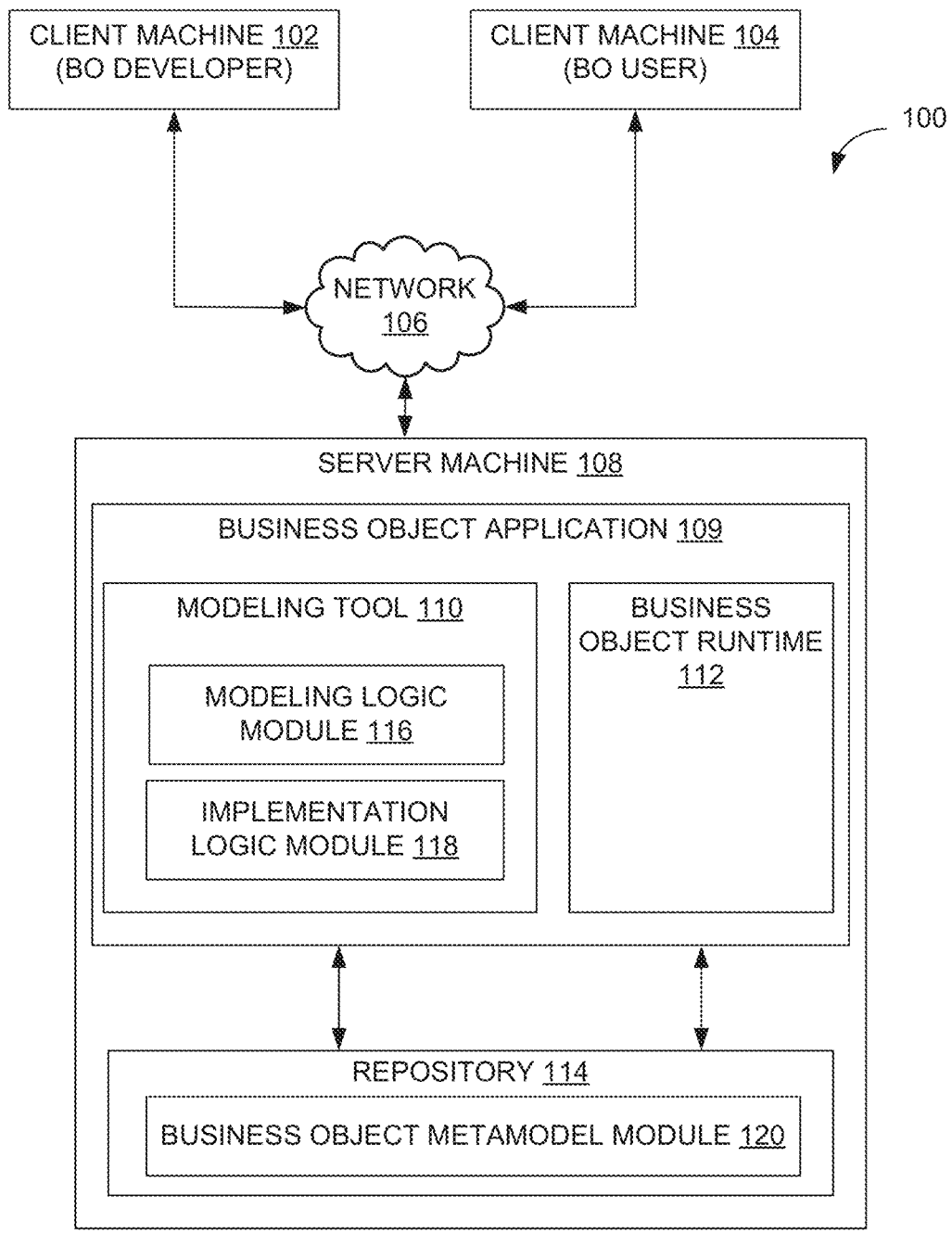
FIG. 1 is a block diagram depicting an example environment within which example embodiments may be deployed.

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive subject matter in unnecessary detail, well-known instruction instances, protocols, structures, and techniques have not been shown in detail. As used herein, the term "or" may be construed in an inclusive or exclusive sense. The term "user" may be construed to include a person or a machine. The term "interface" may be construed to include an application program interface (API) or a user interface. The term "database" may be construed to include a database or a NoSQL or non-relational data store (e.g., Google's BigTable or Amazon's Dynamo). The term "business object" may mean an object that represents an entity of a business inside a software application. For example, a business object may represent a person (e.g., an employee of a company) or a concept (e.g., a process within a company) inside an enterprise information management software application.

A method to model a business object is disclosed. An analysis module analyzes elements of a business object. A modeling module models business object logic based on the elements of the business object. An implementation module implements the modeled business object logic. A repository stores the modeled business object logic. A business object runtime module executes the modeled business object logic.

In one embodiment, the modeling module models the business object logic at a node of the business object. The modeling module determines a value for the node of the business object, validates the node based on the value, generates messages corresponding to the validation of the node, and modifies the business object instance based on the value of the node of the business object.

In one embodiment, the modeling module models the business object logic at a node element of the business object. The modeling module determines a value for the node element of the business object, validates the node element based on the value, generates messages corresponding to the validation of the node element, and modifies the business object instance based on the value of the node element of the business object.

In another embodiment, the business object processing framework uses determinations and validations to implement the business object logic. A metadata repository stores the modeled business object logic and pre-existing business object models. The metadata repository comprises a repository metamodel.

The modeling and the design of a business object (BO) may be performed using a metadata repository (MDRS) workbench while implementation may be performed in an implementation framework such as a Business Object Processing Framework (BOPF).

The business object (BO) developer currently models the data types for the nodes, and then models the structure of the business object in the metadata repository (MDRS). The developer then generates the internal representation and database persistency with the frameworks like BOPF, Object Engine, CRM Document Framework, and Procurement Document Framework.

Business objects are modeled in a MDRS and the implementation aspects are done in a Business Object Processing Framework (BOPF) for many business objects. Business objects implement determinations and validations in a BOPF for the business logic. The focus of this disclosure is to evaluate how to model these determinations and validations in a MDRS.

For illustration purposes, the business object Inbound Delivery is used as a reference for this disclosure. The present modeling method described in the present disclosure is not limited to the business object Inbound Delivery but may be applicable to other types of business objects as well. This business object (the business object Inbound Delivery) will be analyzed to evaluate the overall percentage of business logic which can be modeled. The advantage of this approach would be to make a BO meta-model-centric and also reduce developer implementation effort. This could also help in extensibility scenarios.

FIG. 1 is a block diagram depicting an example environment 100 within which example embodiments may be deployed. The environment 100 includes one or more client machines (e.g., client machine 102 of a business object developer and client machine 104 of a business object user). For example, the client machines 102, 104 may be personal computers.

In one embodiment, the client machine 102 may be used to model business objects. The client machine 104 may be used to access and operate the business object that was modeled by client machine 102. The client machine 102 may execute a web browser (not shown) or a software application (not shown). For example, the web browser may be any browser commonly used to access a network of computers such as the World Wide Web. The web browser may load a user interface to create and model business objects. In another embodiment, the software application may load a user interface to create and model business objects.

In another embodiment, the web browser or the software application may display (e.g., using a tree control) a visual representation of a business object (BO). The visual representation of the business object may include a visual representation of one or more data items of the business object. A data item of the business object may be a unit of data corresponding to the business object that is managed by an application that provides the business object. The visual representation of the business object may include a diagram of the relationships between the business object and the one or more data items of the business object. The visual representation of the business object may also include a diagram of the relationships between the one or more data items of the business object.

The environment 100 includes one or more server machines (e.g., server machine 108). The server machine 108 executes one or more applications (e.g., business object application 109). The business object application 109 includes a modeling tool 110 and a business object runtime 112.

The modeling tool 110 may be configured to analyze business objects and model business object logic after the analyzed business objects. A business object may correspond to one or more entities within the business object application 109 that represent things in a business to which the business object application 109 pertains. For example, the business object may map a source data structure in a database to business terms used by non-information technology analysts. The business object may also correspond to a function of the database or the business object application 109. For example, if the business object application 109 is a human resources application pertaining to recruiting of candidates for job openings within a company, the business object may correspond to a person (e.g., a job candidate) who has applied for a job opening. The business object may include one or more data items. The data items of the business object may correspond to any data that one or more additional applications maintain with respect to the business object. For example, the data item may be a resume of a person (e.g., a candidate for an open position at a company) represented by the business object or the data item may be a time card of a person (e.g., an employee of a company) represented by the business object.

In one embodiment, the modeling tool 110 includes a modeling logic module 116 and implementation logic module 118. The modeling logic module 116 may be configured to model a business object based on the value of its structure. The implementation logic module 118 may be configured to implement the modeled business object logic in a processing framework. The modeled business object logic is then stored in a repository 114 that is accessed by business object runtime 112. The business object runtime 112 is configured to execute a modeled business object for client machine 104.

In one embodiment, the repository 114 includes a business object metamodel module 120. For example, the repository 114 comprises a database that includes one or more tables, including a metadata table and an operational data table. The metadata table includes data pertaining to a configuration (e.g., an appearance or behavior). The operational data table includes data that describes or annotates associations between the business object and the data item of the business object (or between the data item and an additional data item of the business object). This operational data table may be associated with a metamodel of the business object. The metamodel may define associations between the business object and additional business objects, between the business object and data items of the business object, or between data items of the business object and data items of the additional business objects. The metamodel may also define actions that the business object supports (e.g., an "Attach" action to attach an email message or attachment of an email message to the business object).

The client machines 102, 104, and server machine 108 may be coupled to each other via a network 106. The network 106 enables communication between systems. Accordingly, the network 106 may be a mobile telephone network, a plain old telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless internet protocols, and instant messaging protocols. The network 106 may be implemented using the Internet, a wide area network (WAN), a local area network (LAN), or any suitable combination thereof.

Figure 2:
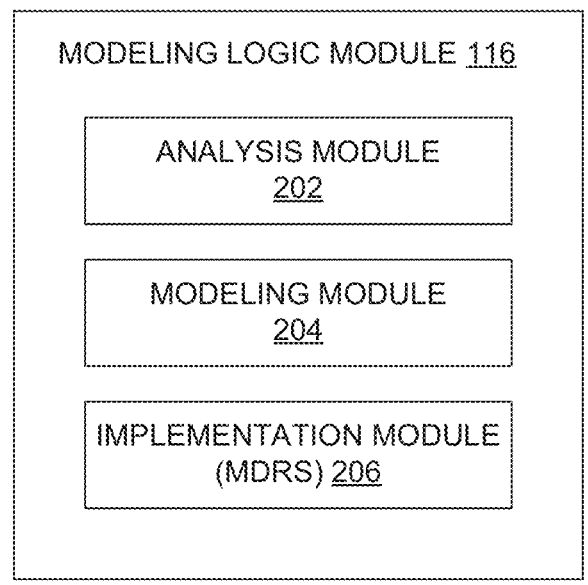
FIG. 2 is a block diagram depicting an example embodiment of a modeling tool.

FIG. 2 is a block diagram depicting an example embodiment of a modeling logic module 116. The modeling logic module 116 includes an analysis module 202, a modeling module 204, and an implementation module 206 (e.g, MDRS, also referred to as a code generation module). The analysis module 202 analyzes elements of a business object. In one embodiment, the elements may include nodes and node elements. In another embodiment, the elements may include roots and nodes. The value of the corresponding elements are determined and used by the modeling logic module 204 to model business object logic. In one embodiment, the modeling logic module 204 models a structure of the business object in a metadata repository (of repository 114 (FIG. 1)) at the server 108 (FIG. 1). The implementation module 206 implements the modeled business object logic in a business object processing framework.

For illustration purposes, the analysis module 202 determines elements of an Inbound Delivery business object which is a composition of the goods that are received by a product recipient. An Inbound Delivery contains the following main parts:

a root containing information on the parties, locations, statuses, dates and agreements with information on the packaging of the goods to be delivered.

an item containing information on the product to be delivered and its quantity as well as on parties and status.

As an example, the modeling module 204 may create a new data item for the business object based on detection of an action by the user in the user interface inside the web browser (e.g., dragging and dropping by the user of a visual representation of a new data item onto a visual representation of the business object). In this case, the modeling module 204 may create a new data item for the business object. This creation of a new data item may be based on identification by the modeling module 204 that a data item corresponding to the new data item does not exist for the business object. This new data item may be associated with the business object via a registration.

The modeling module 204 identifies relationships between the business objects of an application, between each of the business objects and their associated data items, and between each of the associated data items. The modeling module 204 may identify the relationships based on querying the applications containing the business objects (e.g., via an API of the applications). The modeling module 204 may also identify the relationships by analyzing the metamodel of the relationships.

The metamodel may include definitions not only of relationships between business objects (and data items of the business objects) that are maintained by an application that provides the business objects (e.g., relationships obtained from querying the application), but it may also include definitions of relationships pertaining to data items that are not maintained by the application that provides the business objects. For example, the modeling module 204 may identify the relationships based on a definition included in the metamodel. The metamodel may include definitions of relationships between business objects and data items of the business objects (or between data items of the business objects) that are independent of the applications that provide the business objects. For example, the metamodel may include a definition of a relationship between a resume of a person and a business object that represents the person even if the application that provides the business object is unaware of such a relationship. Additionally or alternatively, definitions of relationships that are independent of the application that provides the business object may be stored separately from the metamodel (e.g., such definitions may be maintained by the business object application 109 (FIG. 1)). In this way, the modeling module 204 enables a user to associate any data item with any business object. The modeling module 204 may maintain definitions of relationships in an operational data table in accordance with one embodiment.

In one embodiment, the modeling of business logic in the MDRS may be done by adding MDRS extensions. Extensions may be built at the node element level and at node level where the business logic can be modeled.

Two kinds of business logic can exist:

"Set" to determine a value for a node/node element and to modify the BO based on the value.

"Check" to validate a node or a node element and to raise appropriate messages.

Some examples of use cases are as follows:

Set at node element ->set default value for an element based on some conditions

Check at node element ->check if value of an element is initial or check against list of code values Set at node ->create/delete node based on certain conditions Check at node ->check for existence of a sub-node In one embodiment, the modeling module 204 performs the modeling at a node element. The idea is to provide each node element with the option to model business logic. The following structure is proposed for the modeling:

Logic Type: Set (similar to determinations in BOPF)

Target Data Container: Joins can be formed to get a target data container on which logic is to be applied. Anchor nodes for join will be the node at which the node element exists Condition: Complex conditions, similar to FSI selection parameters, can be formed. Either the current node or the target data container can be used to define conditions Expression: Expression defines the actual modification which will occur. There are different kinds of expressions which are possible:

Constant—Set a constant value to a node element

Formula—Based on the data type calculate the result value for a node element

Property—Set dynamic properties for a node element e.g. make it read-only/enabled etc.

Predefined—For recurring special cases

Logic Type: Check (similar to validations in BOPF)

Condition & Target Data Container: Similar as logic type "set".

Message: Attach the message object (already available in MDRS for each node) and required severity and placeholders.

Figure 6A:
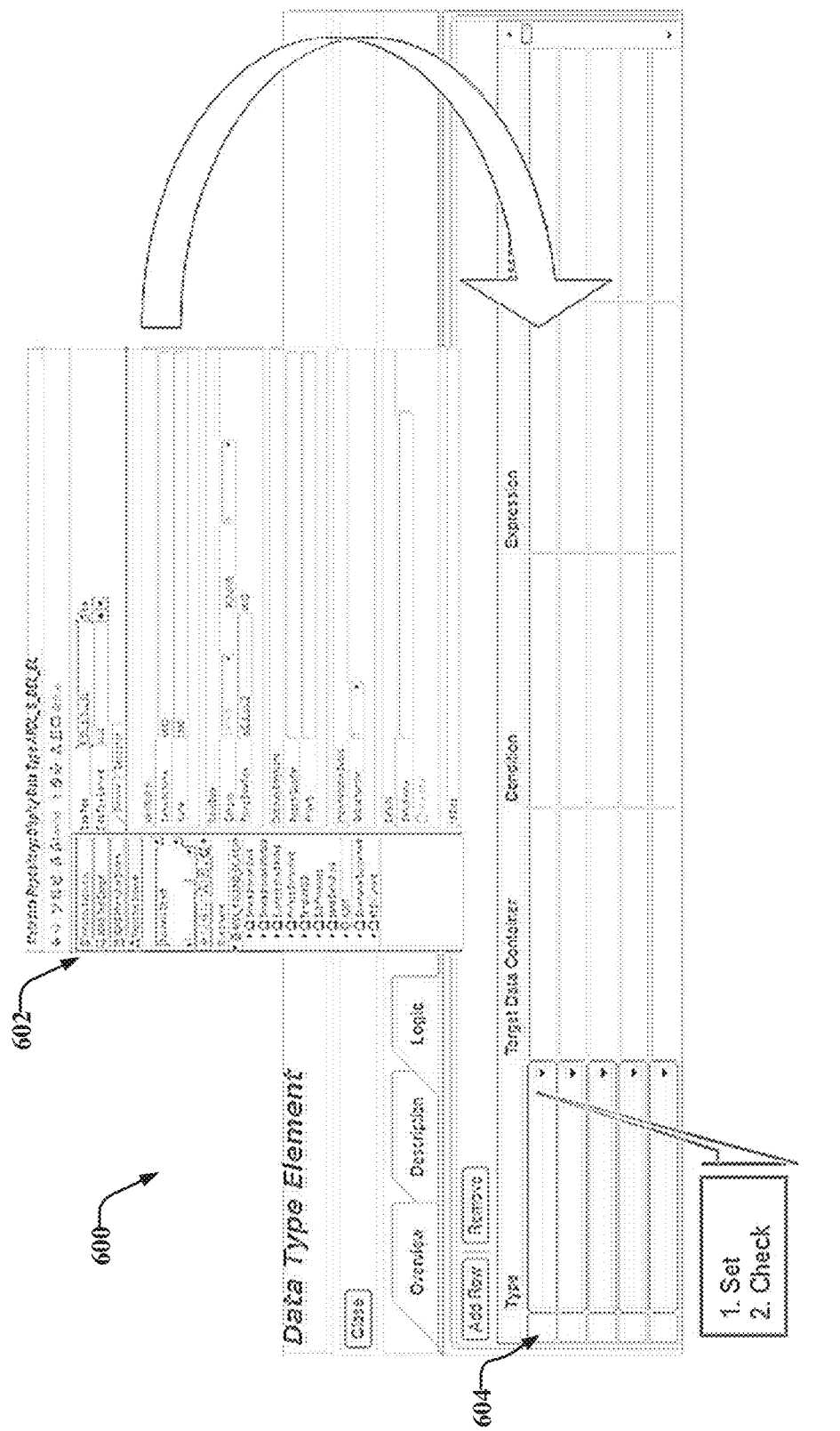
FIG. 6A illustrates an example embodiment of a user interface for the set and check logic types.

FIG 6A illustrates an example embodiment of a user interface 600 for the set and check logic types 604. A message object 602 may be attached to the type 604.

Figure 6B:
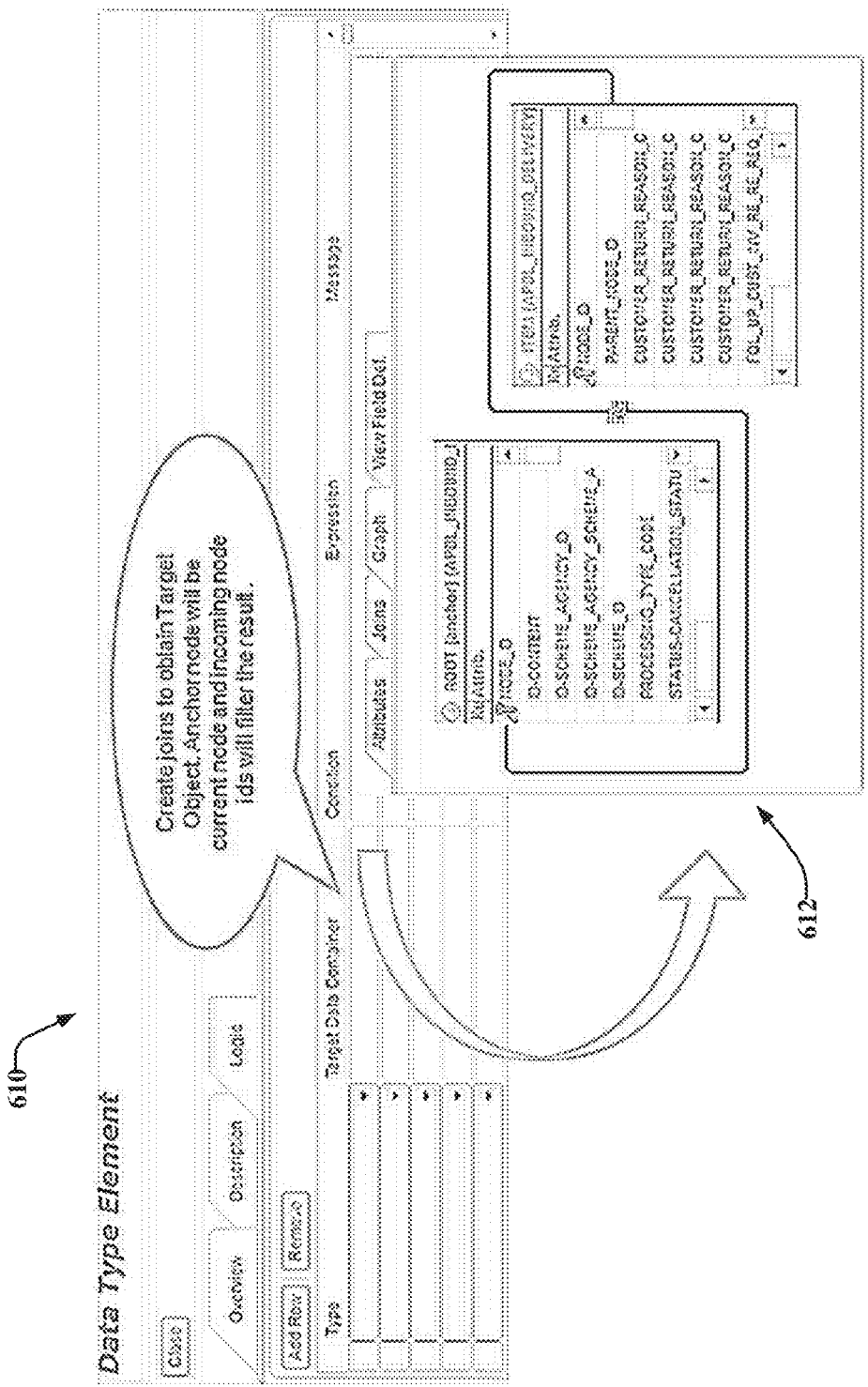
FIG. 6B illustrates an example embodiment of a user interface for target data container based on joins.

FIG. 6B illustrates an example embodiment of a user interface 610 for target data containers 612 based on joins.

Figure 6C:
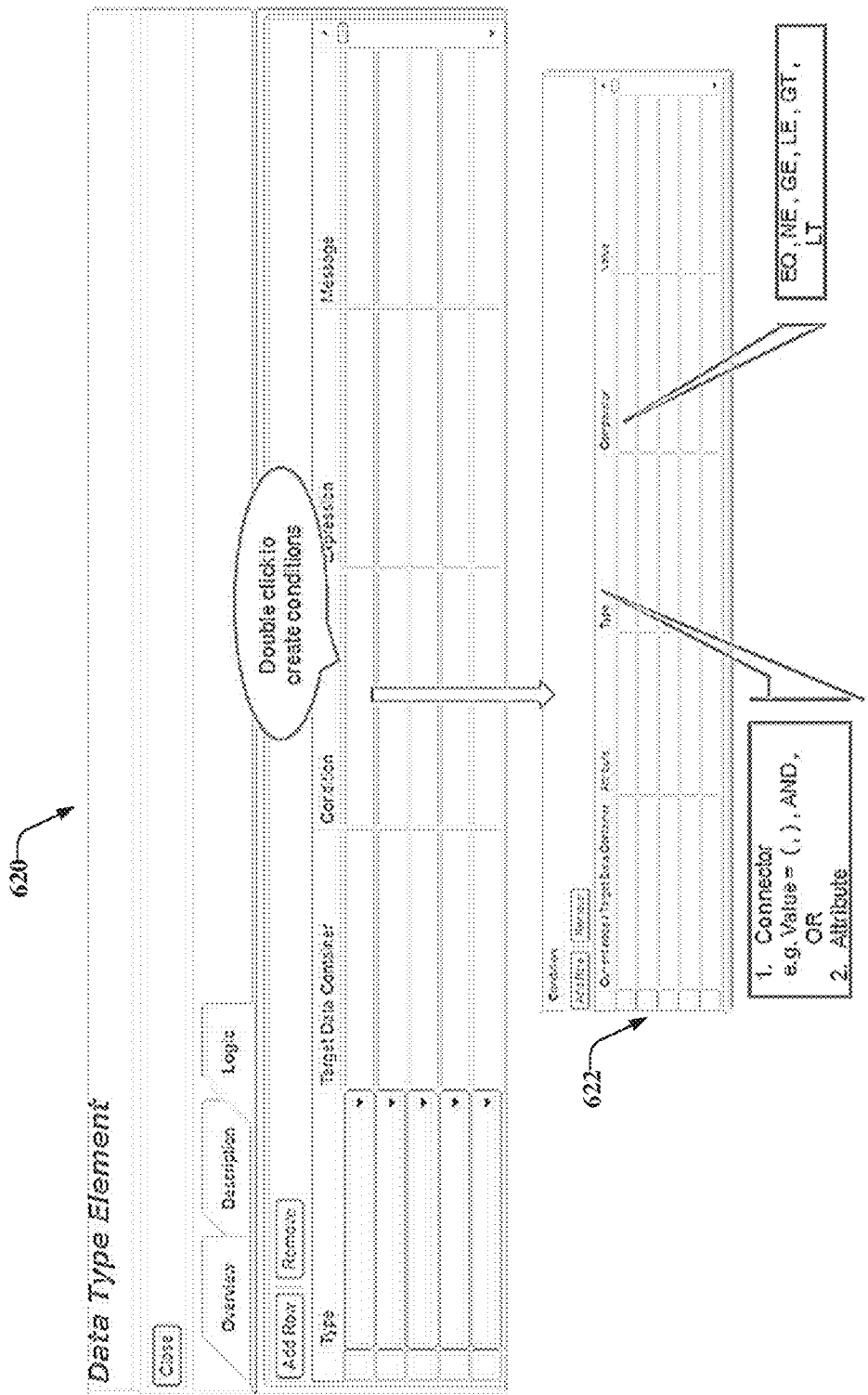
FIG. 6C illustrates an example embodiment of a user interface for modeling conditions.

FIG. 6C illustrates an example embodiment of a user interface 620 for modeling conditions 622. Conditions 622 can also be modeled. There is a connector which can take value (,),=, AND, OR etc which is used to connect expressions. The comparator is used to compare values (EQ, NE, GE, LE, GT, LT etc.).

Figure 6D:
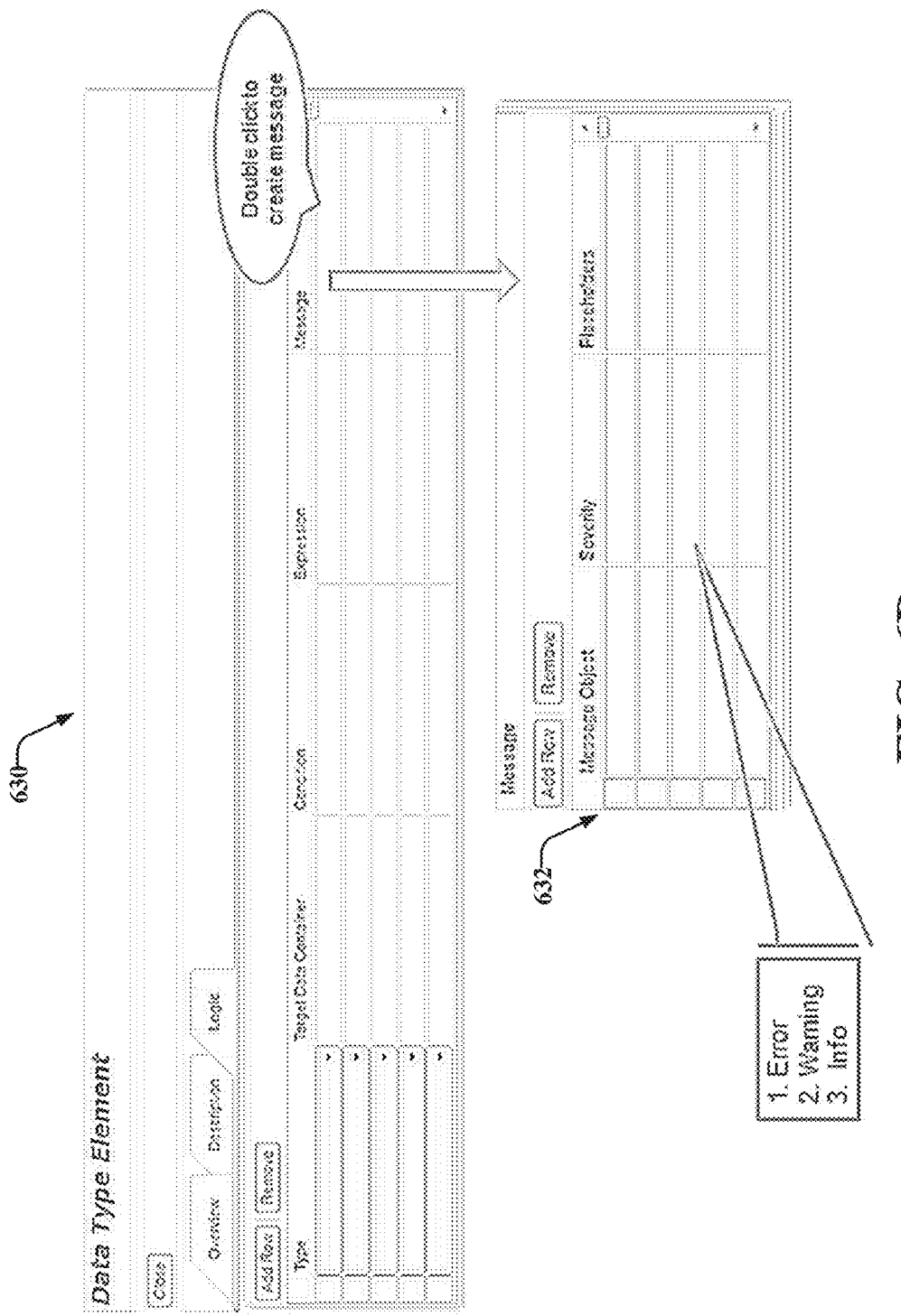
FIG. 6D illustrates an example embodiment of a user interface for generating messages.

FIG. 6D illustrates an example embodiment of a user interface 630 for generating messages 632. Messages 632 (relevant only for "check" type logic) can be generated and displayed based on a check. There might an error message or warning/information messages. Since the messages 632 are now modeled in a MDRS, messages 632 can be selected based on the severity of error in the modeling in the system.

Figure 6E:
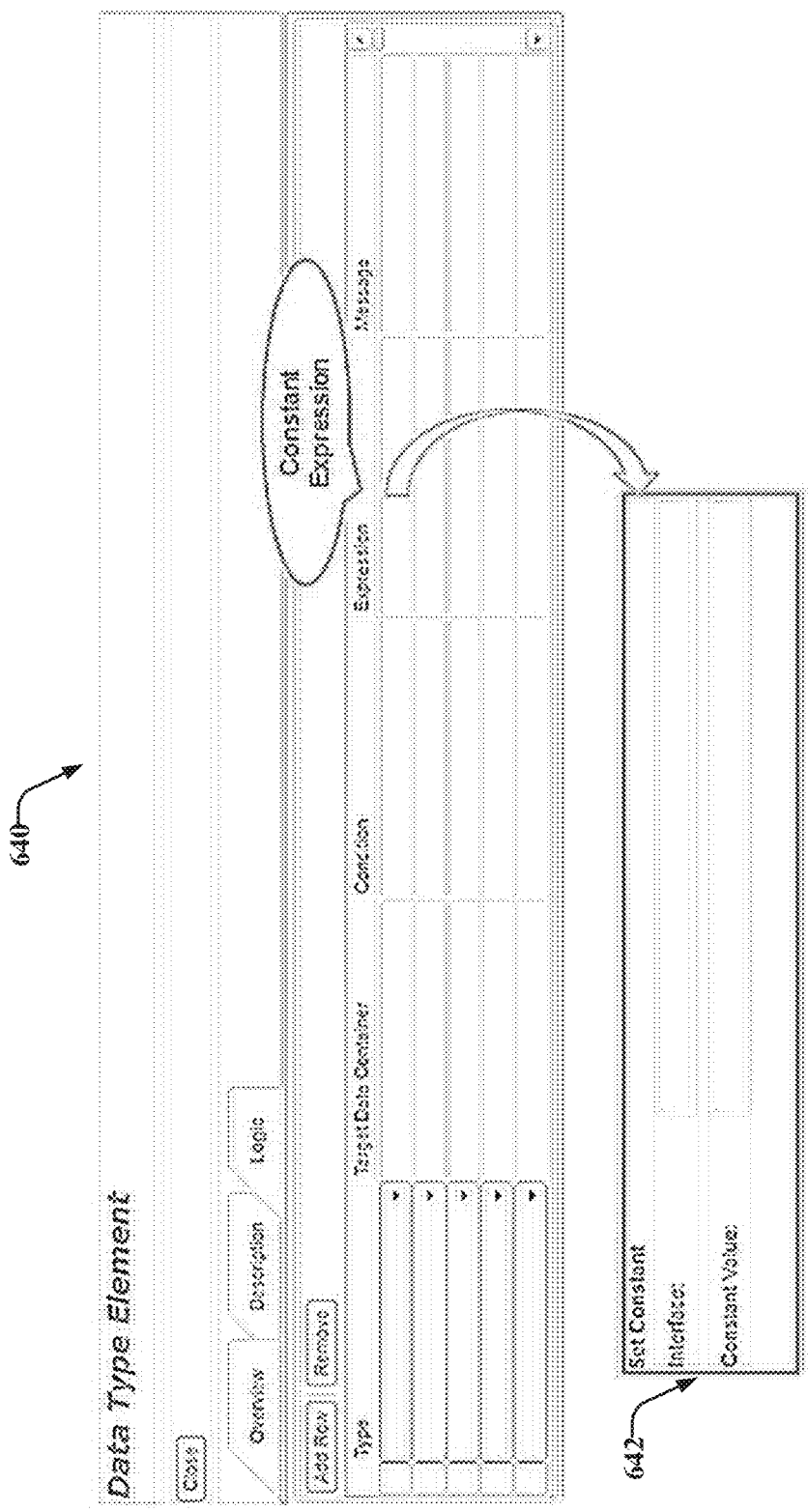
FIG. 6E illustrates an example embodiment of a user interface for setting constant values.

FIG. 6E illustrates an example embodiment of a user interface 640 for setting constant values 642. In some cases, values have to be set from constants defined in interfaces such as this example embodiment.

Figure 6F:
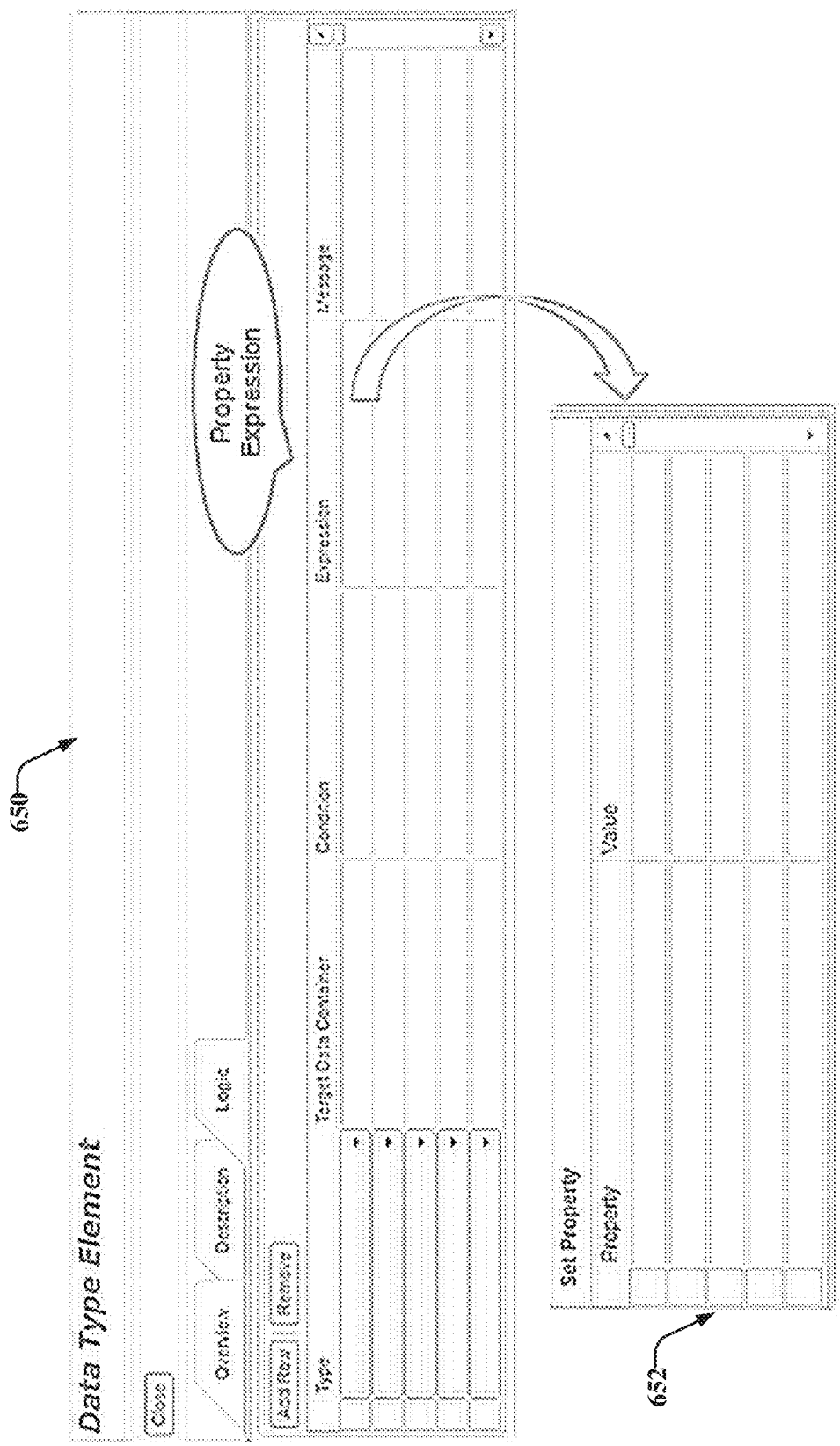
FIG. 6F illustrates an example embodiment of a user interface of how property handling can be modeled in straight forward cases.

FIG. 6F illustrates an example embodiment of a user interface 650 designed to allow property handling 652 to be modeled in straightforward cases. Property handling 652 is an important aspect of modeling business objects. Currently all property handling 652 is coded.

Figure 6G:
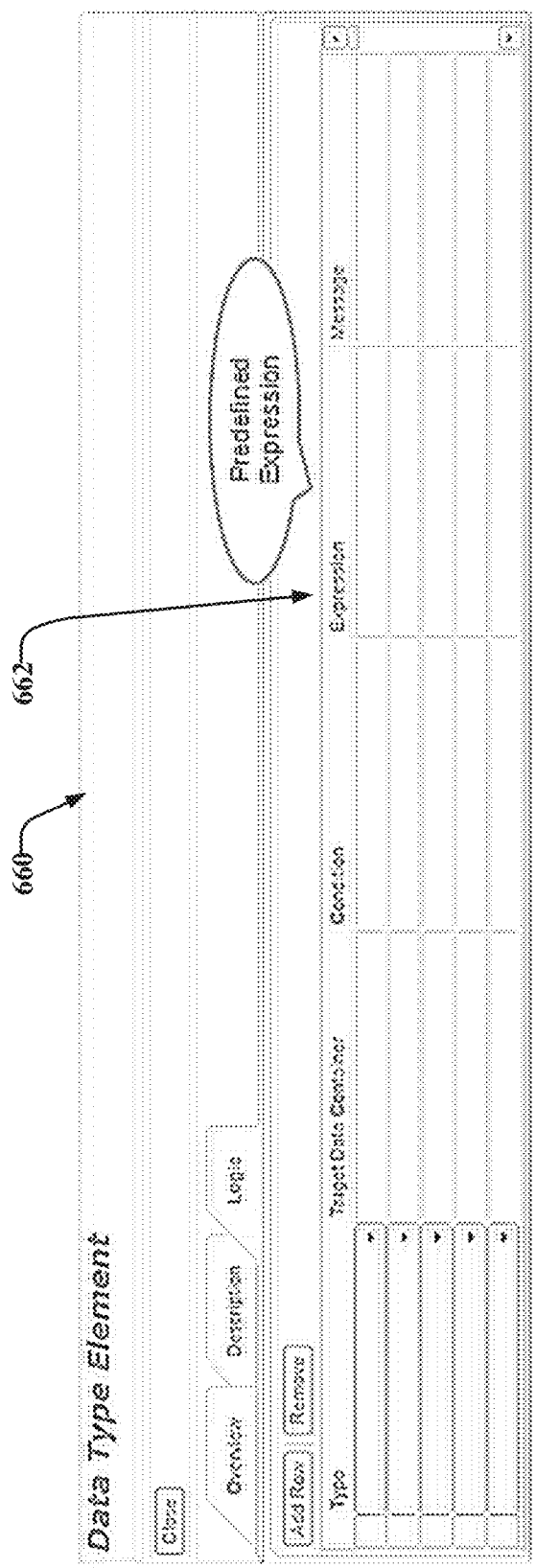
FIG. 6G illustrates an example embodiment of a user interface for predefined expressions.

FIG. 6G illustrates an example embodiment of a user interface 660 for predefined expressions 662. The following are common use cases for predefined expressions 662:

ID-UUID determination. For this case, reference field (ID) of source BO and BO, node and key details of target BO are to be maintained so as to determine the WAD.

Check for unique ID. For this case, the composite key is defined for which ID should be unique. For example, for item ID unique for every Inbound Delivery composite key corresponds to item ID+Inbound Delivery ID.

Check for valid character set (define regular expression).

Figure 6H:
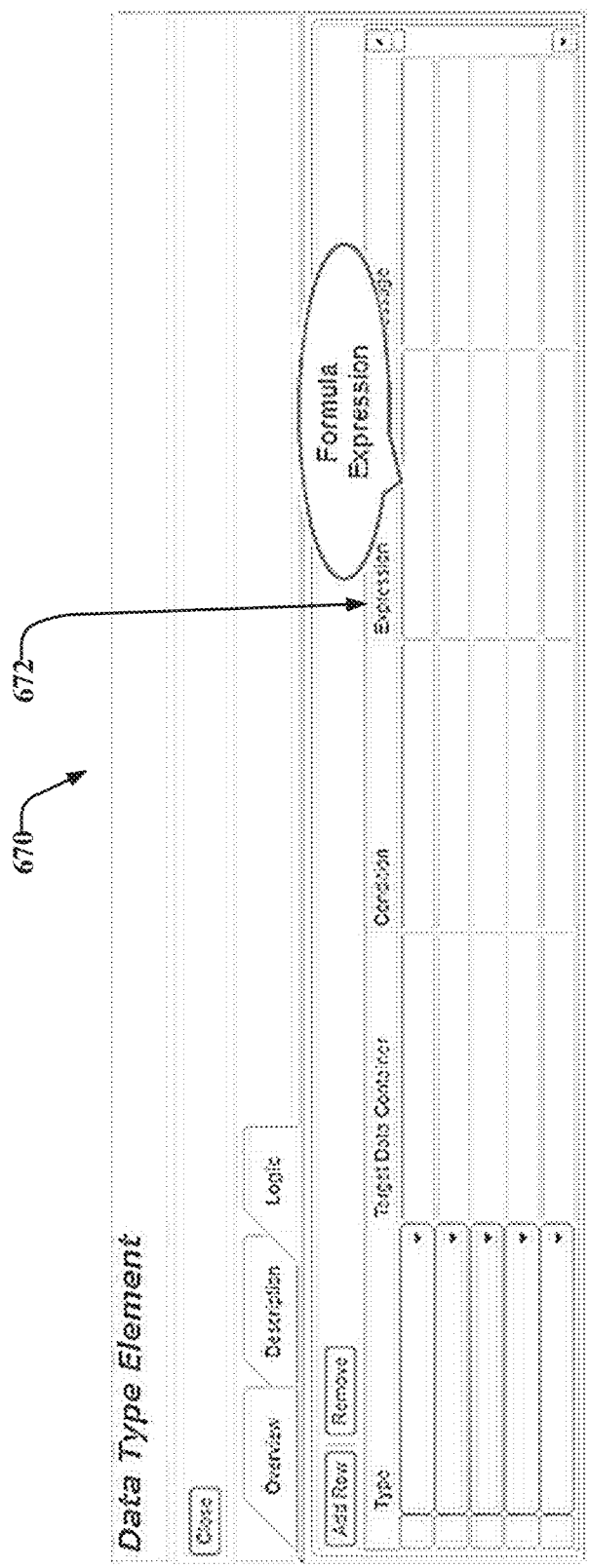
FIG. 6H illustrates an example embodiment of a user interface for formulae.

FIG. 6H illustrates an example embodiment of a user interface 670 for formulae 672. Data type formulae can also be defined in the modeling module 204 (FIG. 2) in the following circumstances:

If the data type is "date" then formulae including the addition or deletion of days based on the current date and other time-based criteria can be defined.

If the data type is "text", then the definition of formulae using concatenation should be possible.

If the data type is "number" or "integer", then the definition of formulae using calculation are possible.

Figure 6I:
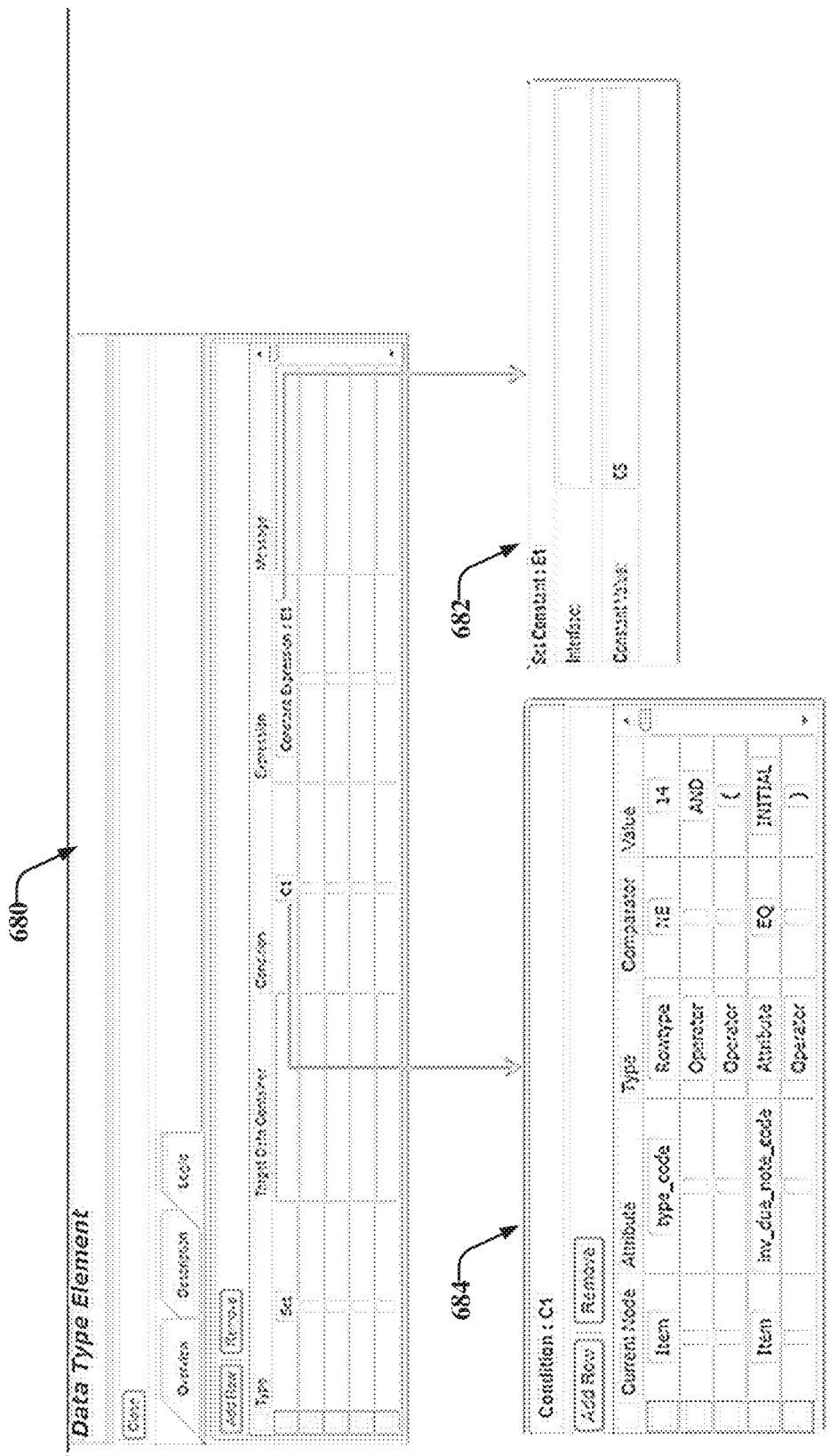
FIG. 6I illustrates an example of a user interface where the initial follow up code on items is to be set.

FIG. 6I illustrates an example embodiment of a user interface 680 where the initial follow up code 682 on an item has to be set to value "05" based on condition 684 "type code" of an item not equal to 14 and the "invoice due note code" on item is "initial."

Figure 6J:
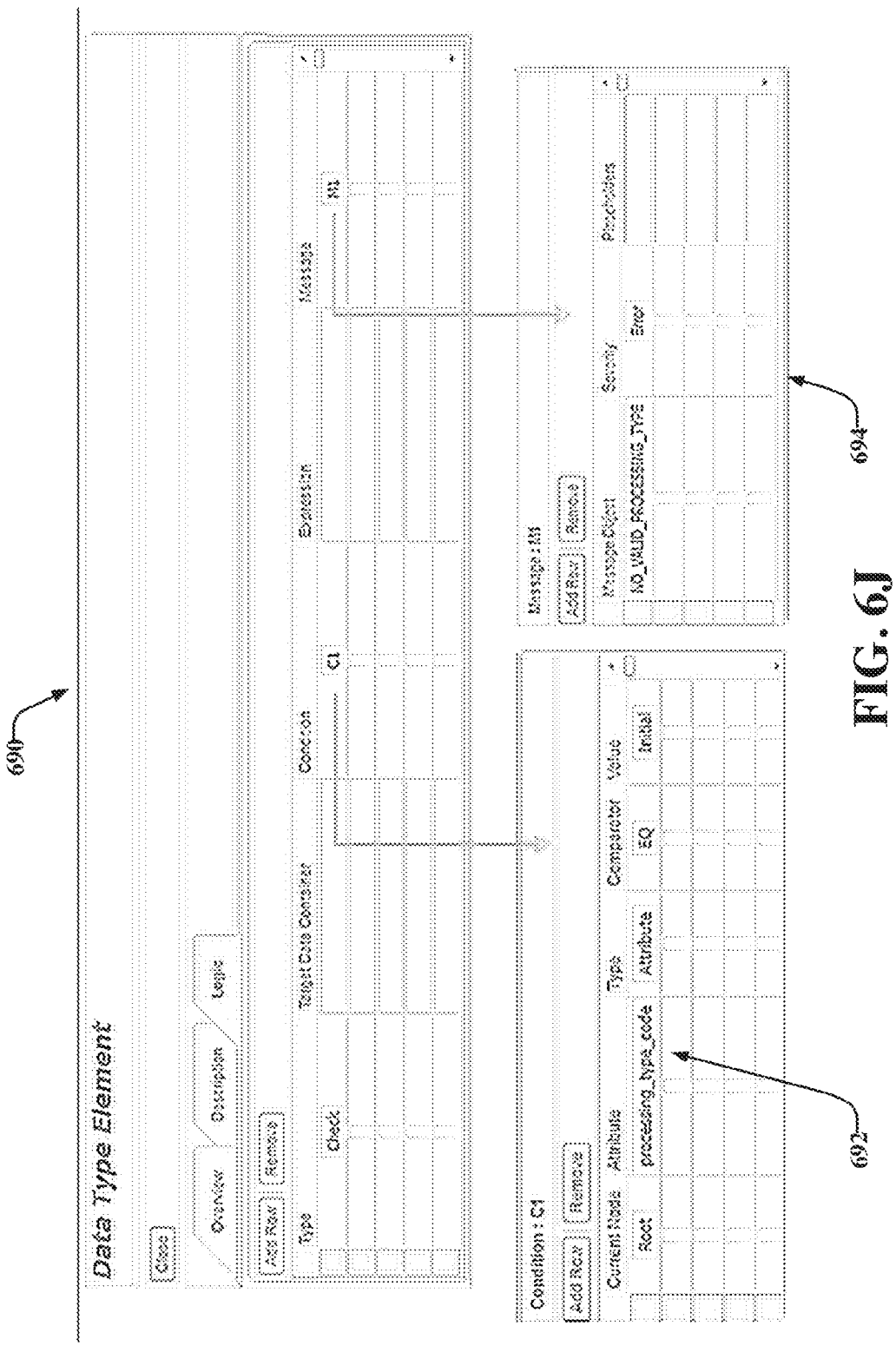
FIG. 6J illustrates an example embodiment of a user interface for check processing type code.

FIG. 6J illustrates an example embodiment of a user interface 690 used to check the attribute "processing type code" 692. Another example of using the user interface to define logic is to check whether the attribute "processing type code" is "initial". In this example, an error message 694 is triggered if the "processing type code" on root node is "initial".

In one embodiment, the modeling module 204 (FIG. 2) performs the modeling at a node level. Here, each node will have the option to model business logic at the node level. Based on the kind of business logic, the following structure is proposed:

Logic Type: Set (similar to determinations in a BOPF)
Target Data Container: Joins can be formed to get a target data container on which logic is to be applied. Anchor nodes for join will be the node at which the node element exists
Condition: Complex conditions, similar to FSI selection parameters, can be formed. Either the current node or the target data container can be used to define conditions
Expression: Expression defines the actual modification which will occur. There are different kinds of expressions which are possible
1) Node Operation—Create or delete node based on conditions
2) Property—Set dynamic properties for a node or sub tree or association from current node.
Logic Type: Check (similar to validations BOPF)
Condition & Target Data Container a Similar as logic type "set".
Message: Attach the message object (already available in MDRS for each node) and required severity and placeholders.

Figure 7A:
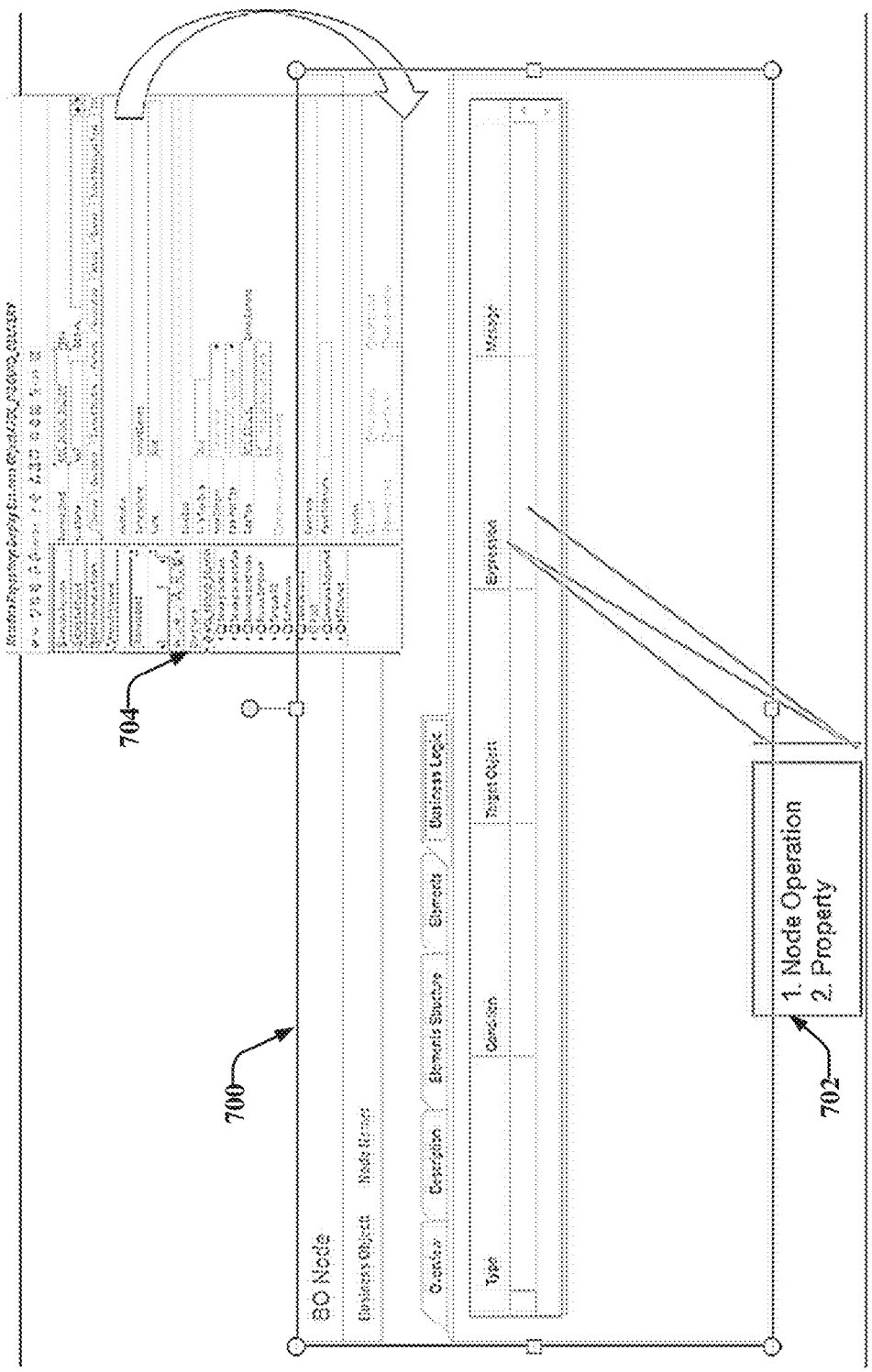
FIG. 7A illustrates an example embodiment of a user interface for modeling business object logic at node level.

FIG. 7A illustrates an example embodiment of a user interface 700 for modeling business object logic 704 at a node level. Different options 702 are possible: "1) Node operation", and "2) Property handling".

Figure 7B:
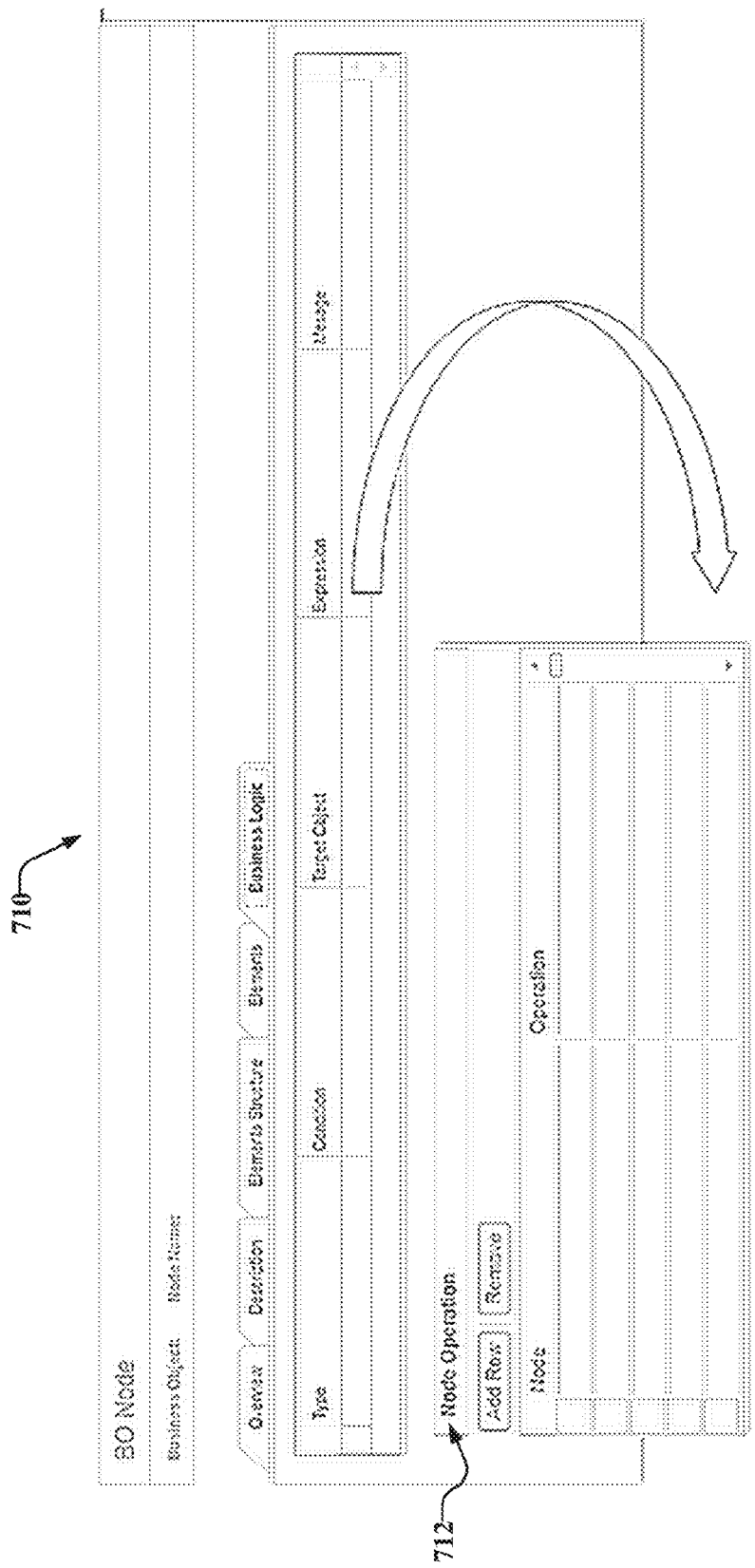
FIG. 7B illustrates an example embodiment of a user interface for a node operation.

FIG. 7B illustrates an example embodiment of a user interface 710 for modeling a node operation 712. Business object node instances can be created and deleted based on specific conditions.

Figure 7C:
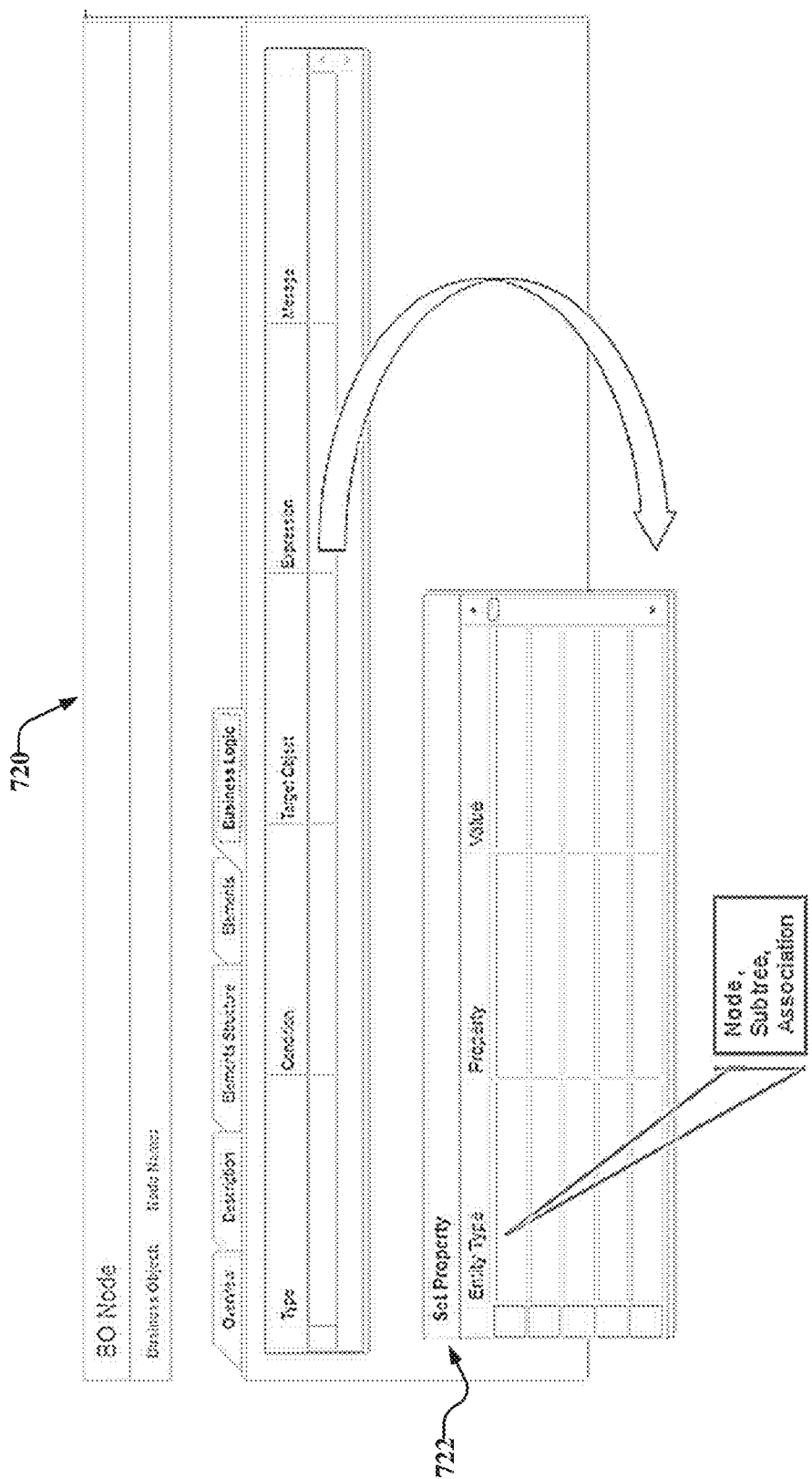
FIG. 7C illustrates an example embodiment of a user interface.

FIG. 7C illustrates an example embodiment of a user interface 720 for setting node level property 722. Properties can be set at node level, node sub-tree level, or association level.

The implementation module 206 (FIG. 2) may include an implementation module (MDRS) to generate an implementation of the structure of the business object in a business object processing framework at the server.

Figure 3:
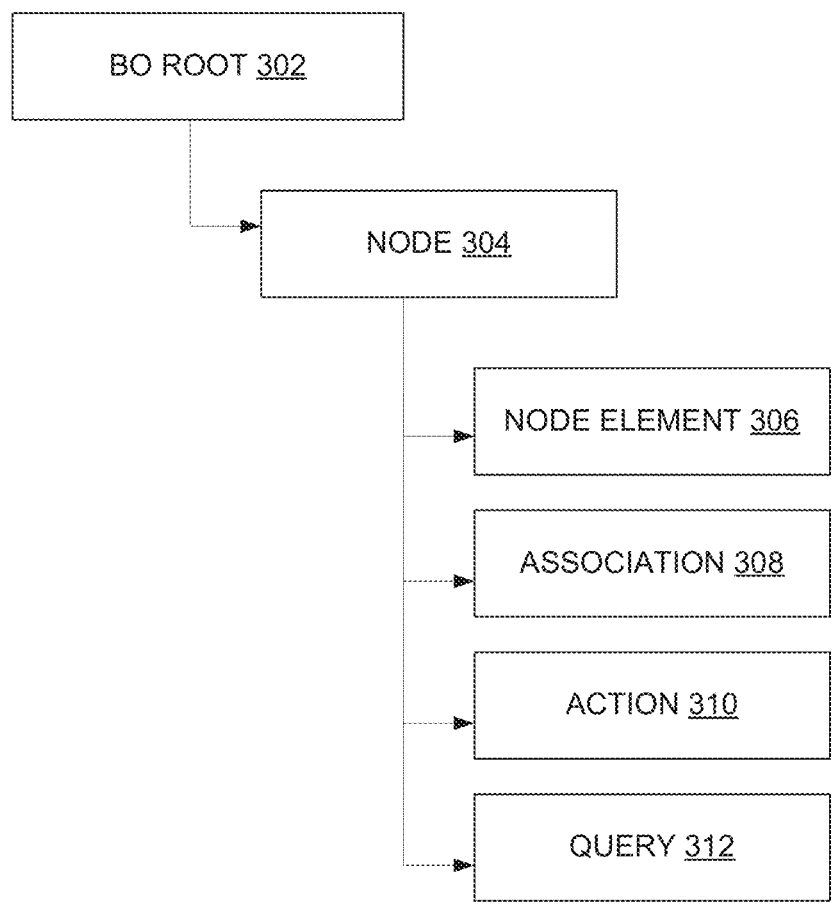
FIG. 3 is a block diagram depicting an example embodiment of a root node and root elements.

FIG. 3 is a block diagram depicting an example embodiment of a. structure of a business object. The root 302 contains the generic information that the analysis module 202 (FIG. 2) needs about the current BO being modeled, such as the name, service provider class, the implementing framework, and so forth.

Node 304 corresponds to all the nodes that a BO being modeled will have. They may all have the same meta-data, irrespective of their specific data-types. A hierarchical graph is used in the UI to render the BO structure.

The node element 306, association 308, action 310 and query 312 are all children of node 304 and are the elements that each node 304 of a BO can have.

While every node 304 has to have a corresponding node element 306, it may not be necessary that it have an association 308, action 310, or a query 312, therefore the cardinalities of the children of node 304 are respectively 1:1, 0:1, 0:1 and 0:1.

Figure 4:
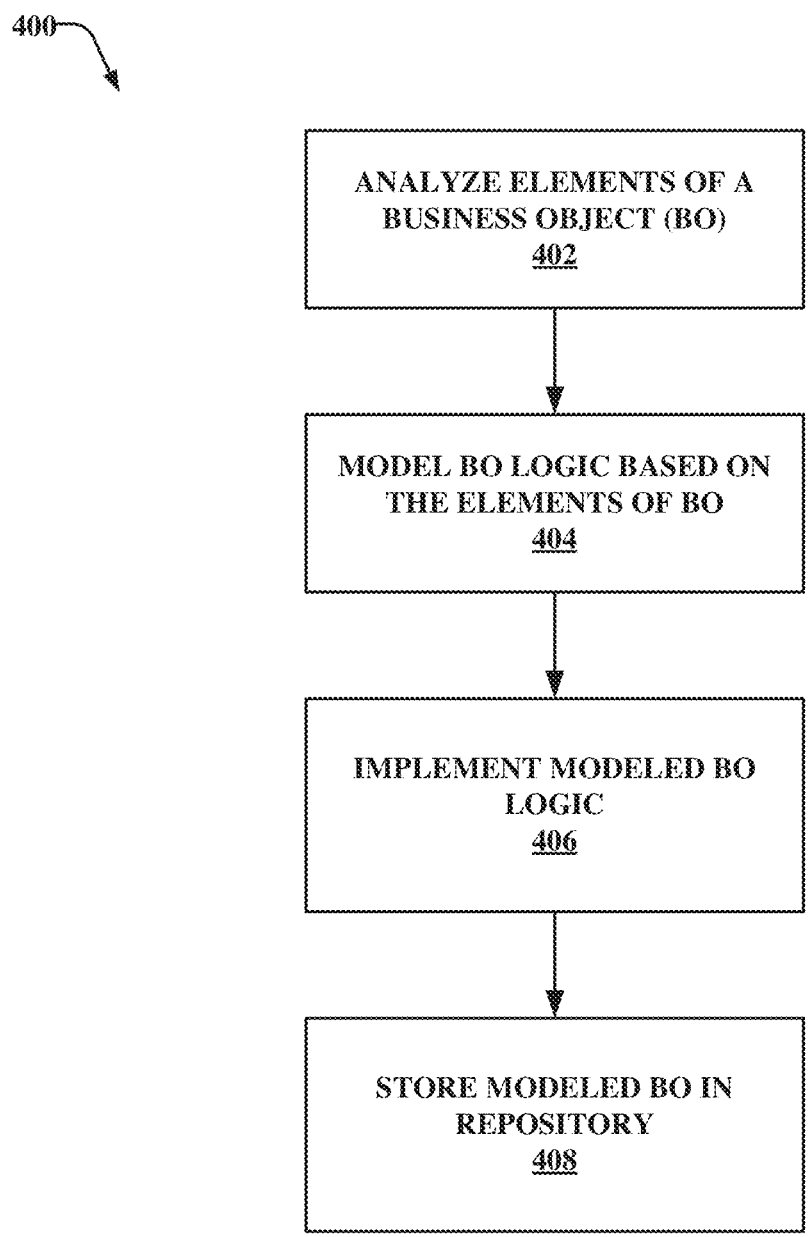
FIG. 4 is a flowchart depicting an example embodiment of a method for modeling a business object.

FIG. 4 is a flowchart 400 depicting an example embodiment of a method for modeling a business object.

At operation 402, elements of a business object are analyzed. In one embodiment, the analysis module 202 (FIG. 2) performs the analysis to determine the values at each node 304 and/or each node element 306 (FIG. 3) of the business object.

At operation 404, business object logic is modeled based on the elements of the business object. In one embodiment, the modeling module 204 models the business object logic based on the values of the node and/or node elements as determined by analysis module 202 (FIG. 2).

At operation 406, the modeled business object logic is implemented in a business object processing framework. In one embodiment, the implementation module 206 generates and implements the code for the modeled business logic in a processing framework. The business object processing framework may use determinations and validations to implement the business object logic.

At operation 408, the modeled business object logic is stored in the repository 114 accessible by the business object runtime 112 (FIG. 1). The modeled business object logic can be executed by the business object runtime 112. In one embodiment, the modeled business object logic is stored in a metadata repository of repository 114 that already contains pre-existing business objects models. The metadata repository may also store a repository metamodel.

Figure 5A:
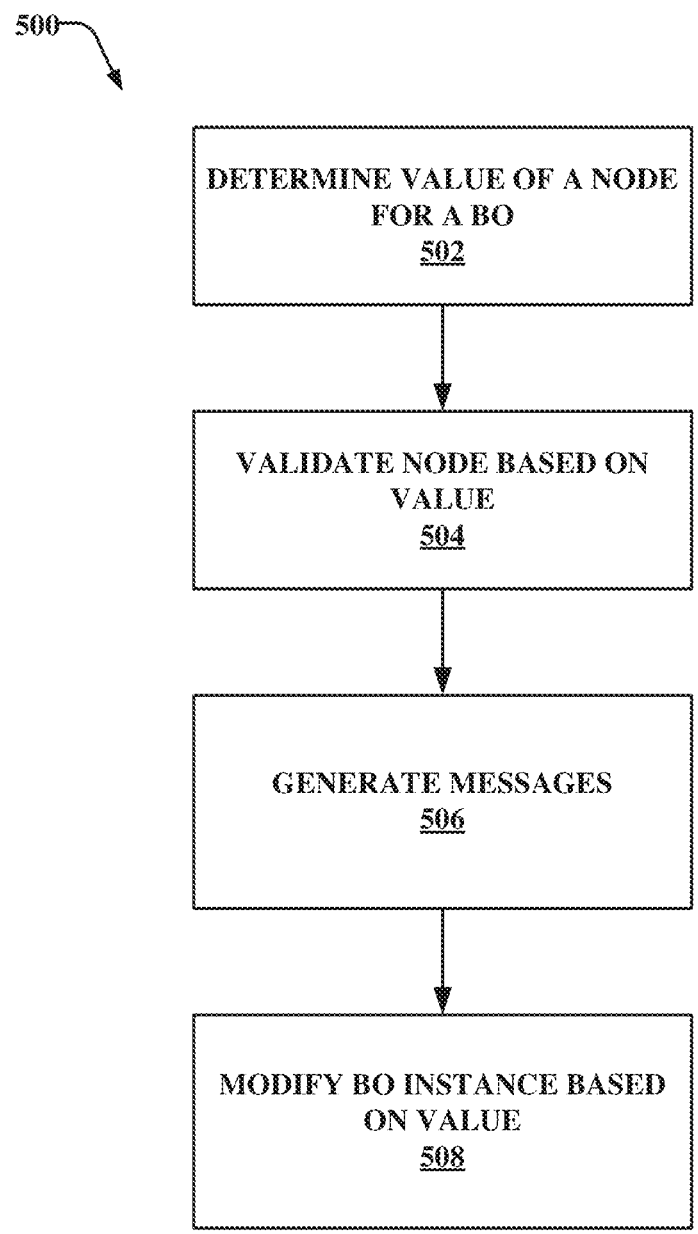
FIG. 5A is a flowchart depicting an example embodiment of modeling business logic.

FIG. 5A is a flowchart 500 depicting an example embodiment of modeling business object logic.

At operation 502, a value for the node of the business object is determined. In one embodiment, the analysis module 202 (FIG. 2) performs the analysis to determine the values at each node of the business object.

At operation 504, the node is validated based on the value at the node. At operation 506, messages are generated corresponding to the validation of the node. In one embodiment, the modeling module 204 (FIG. 2) models the business object logic based on the values of the node as determined by analysis module 202 (FIG. 2).

At operation 508, the business object instance is modified based on the value of the node of the business object.

Figure 5B:
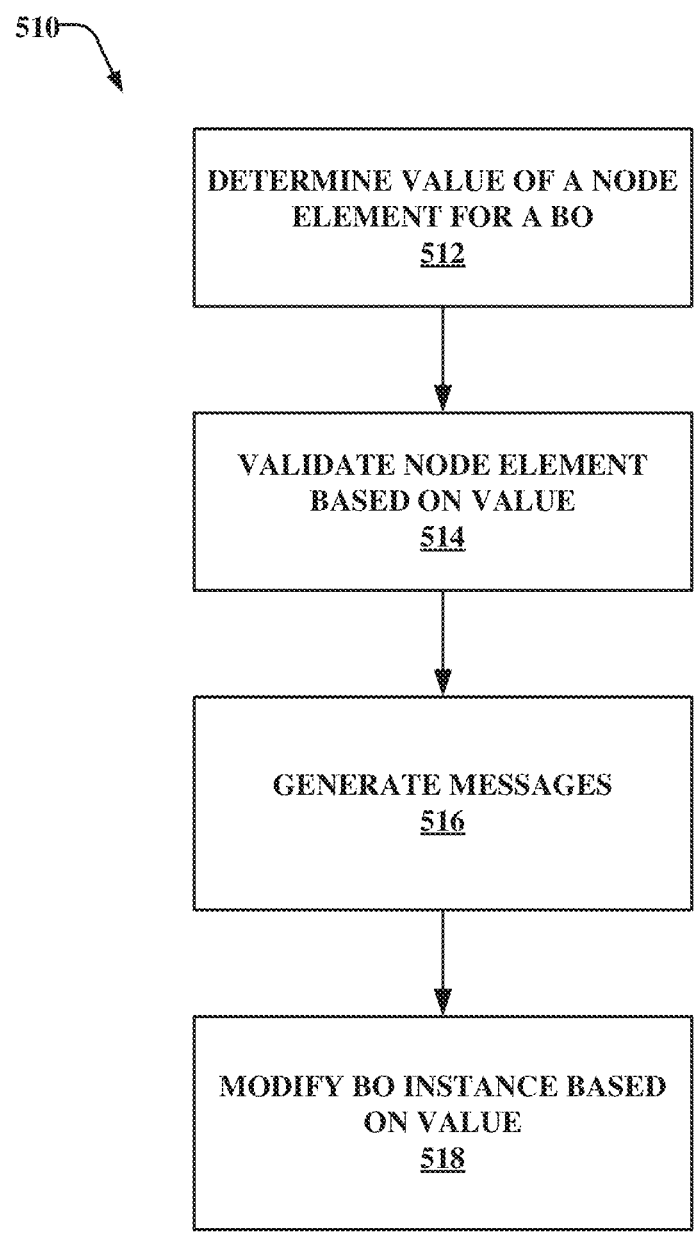
FIG. 5B is a flowchart depicting another example embodiment of modeling business logic.

FIG. 5B is a flowchart 510 depicting another example embodiment of modeling business logic.

At operation 512, a value for the node element of the business object is determined. In one embodiment, the analysis module 202 (FIG. 2) performs the analysis to determine the values at each node element of the business object.

At operation 514, the node element is validated based on the value at the node element. At operation 516, messages are generated corresponding to the validation of the node. In one embodiment, the modeling module 204 (FIG. 2) models the business object logic based on the values of the node element as determined by analysis module 202 (FIG. 2).

At operation 518, the business object instance is modified based on the value of the node element of the business object.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as "software as a service" (SaaS). For example, at least some of the operations may be performed by a group of computers (as examples of machines including processors), these operations being accessible via a network (e.g., the network 106 (FIG. 1)) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers, A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
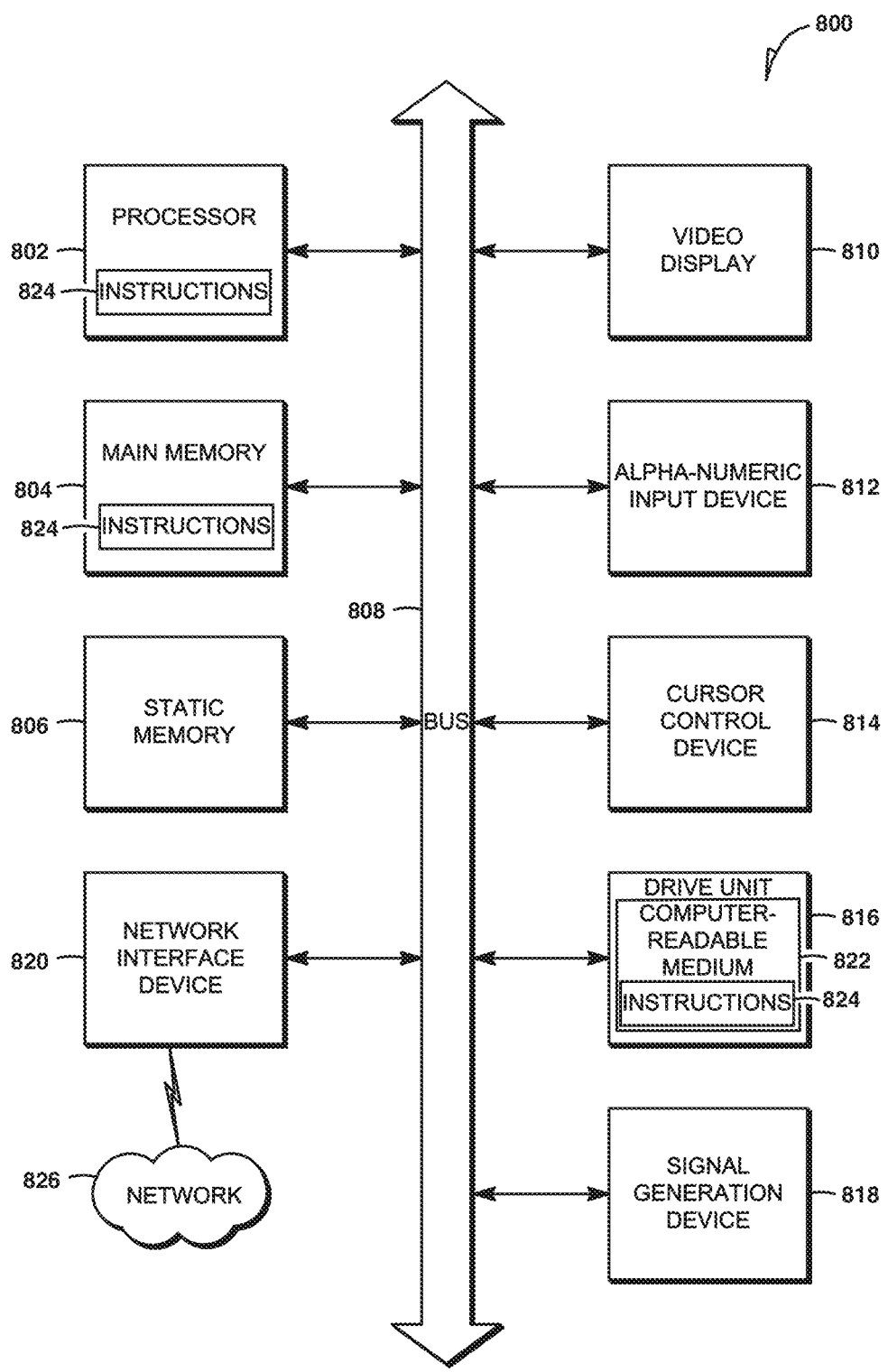
FIG. 8 is a block diagram of an example computer system on which methodologies described herein may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single embodiment of the invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   determining elements currently existing in a business object, the business object including an object data structure inside an enterprise information management software application and representing an entity;

identifying that a new data item does not exist for the business object;

detecting, by a hardware processor of a machine, an action on a visual representation of the new data item in a graphical user interface onto a visual representation of the business object in the graphical user interface;

forming the new data item for the business object based on the detection;

registering the new data item with the business object;

identifying relationships between business objects of the enterprise information management software application, between each business object and their associated data items, and between each of the associated data items and the new data item using a metamodel, the metamodel identifying relationships between business objects and data items of the business objects that are independent of the applications that provide the business objects;

forming a new business object logic based on the identified relationships of the business object, the new business object logic executable with a business object runtime;

storing the new business object logic in a metadata repository containing other business object logic;

modeling the business object logic at a node of the business object;

determining a value for the node of the business object;

validating the node based on the value;

generating at least one message corresponding to the validation of the node; and modifying an instance of the business object based on the value of the node of the business object.

2. The computer-implemented method of claim 1 further comprising:

storing the new business object logic in the metadata repository accessible by a business object runtime module; and executing the new business object logic with the business object runtime module.

3. The computer-implemented method of claim 2, wherein the business object processing framework uses determinations and validations to implement the business object logic.

4. The computer-implemented method of claim 3, further comprising:

storing the modeled business object logic in the metadata repository, the metadata repository storing pre-existing business object models.

5. The computer-implemented method of claim 4, wherein the metadata repository comprises a repository metamodel.

6. The computer-implemented method of claim 1 further comprising:

modeling the business object logic at a node element of the business object.

7. The computer-implemented method of claim 6 further comprising:

determining a value for the node element of the business object;

validating the node element based on the value;

generating messages corresponding to the validation of the node element; and modifying an instance of the business object based on the value of the node element of the business object.

8. A system comprising:

one or more hardware processors of a machine;

an analysis module, implemented by the one or more hardware processors of a machine, configured to determine elements currently existing in a business object, the business object including an object data structure inside an enterprise information management software application and representing an entity, and to identify that a new data item does not exist for the business object;

a modeling module configured to detect an action on a visual representation of the new data item in a graphical user interface onto a visual representation of the business object in the graphical user interface, to form the new data item for the business object based on the detection, to register the new data item with the business object, to identify relationships between business objects of the enterprise information management software application, between each business object and their associated data items, and between each of the associated data items and the new data item using a metamodel, the metamodel identifying relationships between business objects and data items of the business Objects that are independent of the applications that provide the business objects, and to model the business object logic at a node of the business object; and an implementation module configured to form a new business object logic based on the identified relationships of the business object, the new business object logic executable with a business object runtime, to store the new business object logic in a metadata repository containing other business object logic, to determine a value for the node of the business object, to validate the node based on the value to generate at least one message corresponding to the validation of the node, and to modify an instance of the business object based on the value of the node of the business object.

9. The system of claim 8, further comprising:

the metadata repository to store the new business object logic; and a business object runtime module coupled to the metadata repository to execute the new business object logic.

10. The system of claim 9, wherein the metadata repository stores the modeled business object logic and pre-existing business object models.

11. The system of claim 10, wherein the metadata repository comprises a repository metamodel.

12. The system of claim 8, wherein the modeling module is to model the business object logic at a node element of the business object.

13. The system of claim 12, wherein the modeling module is configured to:

determine a value for the node element of the business object;

validate the node element based on the value;

generate messages corresponding to the validation of the node element; and modify an instance of the business object based on the value of the node element of the business object.

14. The system of claim 8, wherein the business object processing framework uses determinations and validations to implement the business object logic.

15. A non-transitory machine-readable storage medium storing instructions which, when executed by at least one processor, performs operations comprising:

determining elements currently existing in a business object, the business object including an object data structure inside an enterprise information management software application and representing an entity;

identifying that a new data item does not exist for the business object;

detecting an action on a visual representation of the new data item in a graphical user interface onto a visual representation of the business object in the graphical user interface;

forming the new data item for the business object based on the detection;

registering the new data item with the business object;

identifying relationships between business objects of the enterprise information management software application, between each business object and their associated data items, and between each of the associated data items and the new data item using a metamodel, the metamodel identifying relationships between business objects and data items of the business objects that are independent of the applications that provide the business objects;

forming a new business object logic based on the identified relationships of the business object, the new business object logic executable with a business object runtime;

storing the new business object logic in a metadata repository containing other business object logic;

modeling the business object logic at a node of the business object;

determining a value for the node of the business object;

validating the node based on the value;

generating messages corresponding to the validation of the node; and modifying an instance of the business object based on the value of the node of the business object.

16. The non-transitory machine-readable storage medium of claim 15 further comprising:

storing the new business object logic in the metadata repository accessible by a business object runtime module; and executing the new business object logic with the business object runtime module.

17. A computer-implemented method comprising:

determining elements currently existing in a business object, the business object including an object data structure inside an enterprise information management software application and representing an entity;

identifying that a new data item does not exist for the business object;

detecting, by a hardware processor of a machine, an action on a visual representation of the new data item in a graphical user interface onto a visual representation of the business object in the graphical user interface;

forming the new data item for the business object based on the detection;

registering the new data item with the business object;

identifying relationships between business objects of the enterprise information management software application, between each business object and their associated data items, and between each of the associated data items and the new data item using a metamodel, the metamodel identifying relationships between business objects and data items of the business objects that are independent of the applications that provide the business objects;

forming a new business object logic based on the identified relationships of the business object, the new business object logic executable with a business object runtime;

storing the new business object logic in a metadata repository containing other business object logic and accessible by a business object runtime module;

executing the new business object logic with the business object runtime module; and wherein the business object processing framework uses determinations and validations to implement the business object logic.

18. A system comprising:

one or more hardware processors of a machine;

an analysis module, implemented by the one or more hardware processors of a machine, configured to determine elements currently existing in a business object, the business object including an object data structure inside an enterprise information management software application and representing an entity, and to identify that a new data item does not exist for the business object;

a modeling module configured to detect an action on a visual representation of the new data item in a graphical user interface onto a visual representation of the business object in the graphical user interface, to form the new data item for the business object based on the detection, to register the new data item with the business object, to identify relationships between business objects of the enterprise information management software application, between each business object and their associated data items, and between each of the associated data items and the new data item using a metamodel, the metamodel identifying relationships between business objects and data items of the business objects that are independent of the applications that provide the business objects; and an implementation module configured to form a new business object logic based on the identified relationships of the business object, the new business object logic executable with a business object runtime, to store the new business object logic in a metadata repository containing other business object logic and accessible by a business object runtime module, and to execute the new business object logic with the business object runtime module, wherein the business object processing framework uses determinations and validations to implement the business object logic.

19. A non-transitory machine-readable storage medium storing instructions which, when executed by at least one processor, performs operations comprising:

determining elements currently existing in a business object, the business object including an object data structure inside an enterprise information management software application and representing an entity;

identifying that a new data item does not exist for the business object;

detecting, by a hardware processor of a machine, an action on a visual representation of the new data item in a graphical user interface onto a visual representation of the business object in the graphical user interface;

forming the new data item for the business object based on the detection;

registering the new data item with the business object;

identifying relationships between business objects of the enterprise information management software application, between each business object and their associated data items, and between each of the associated data items and the new data item using a metamodel, the metamodel identifying relationships between business objects and data items of the business objects that are independent of the applications that provide the business objects;

forming a new business object logic based on the identified relationships of the business object, the new business object logic executable with a business object runtime;

storing the new business object logic in a metadata repository containing other business object logic and accessible by a business object runtime module;
executing the new business object logic with the business object runtime module; and
wherein the business object processing framework uses determinations and validations to implement the business object logic.

* * * * *